(12) United States Patent
Douglas et al.

(10) Patent No.: US 12,271,427 B2
(45) Date of Patent: Apr. 8, 2025

(54) SYSTEM AND COMPUTER-IMPLEMENTED METHOD FOR AUTOMATING ACTIVATION OF DISPLAY OF INFORMATION

(71) Applicant: THE CLOUD AND COMPASS LTD, London (GB)

(72) Inventors: Dan Douglas, London (GB); Gregory King, London (GB); Kevin Holloway, London (GB)

( * ) Notice: Subject to any disclaimer, the term of this patent is extended or adjusted under 35 U.S.C. 154(b) by 0 days.

(21) Appl. No.: 18/744,858

(22) Filed: Jun. 17, 2024

(65) Prior Publication Data

US 2024/0419737 A1    Dec. 19, 2024

(30) Foreign Application Priority Data

Jun. 15, 2023   (GB) .................................... 2308941

(51) Int. Cl.
| | | |
|---|---|---|
| *G06F 16/00* | (2019.01) | |
| *G06F 16/9035* | (2019.01) | |
| *G06F 16/909* | (2019.01) | |
| *G06F 16/958* | (2019.01) | |

(52) U.S. Cl.
CPC ........ *G06F 16/9035* (2019.01); *G06F 16/909* (2019.01); *G06F 16/958* (2019.01)

(58) Field of Classification Search
CPC ..................................................... G06F 16/909
See application file for complete search history.

(56) References Cited

U.S. PATENT DOCUMENTS

2022/0107632 A1*  4/2022  Sinha ..................... G06Q 50/06

* cited by examiner

*Primary Examiner* — Ajith Jacob
(74) *Attorney, Agent, or Firm* — RC Trademark Company (57) ABSTRACT

Disclosed is system for automating activation of display of information for at least one site based on real-time footfall data thereof. System comprises sensor arrangement operatively coupled to given site and configured to collect real-time footfall data of given site at intervals of predefined time-period; server arrangement and web portal communicably coupled to sensor arrangement and server arrangement, respectively. Server arrangement is configured to: receive collected real-time footfall data of given site from corresponding sensor arrangement; and process received real-time footfall data to generate real-time metrics. Web portal is configured to: determine one or more potential display spots communicably coupled to web portal located within predetermined vicinity of given site; and activate display of information for given site to be displayed on determined one or more potential display spots, wherein at least one parameter associated with display of information is selected based on real-time metrics.

9 Claims, 4 Drawing Sheets

SYSTEM AND COMPUTER-IMPLEMENTED METHOD FOR AUTOMATING ACTIVATION OF DISPLAY OF INFORMATION

TECHNICAL FIELD

The present disclosure relates to systems for automating activation of display of information for at least one site based on real-time footfall data thereof. Moreover, the present disclosure relates to computer-implemented methods for automating activation of display of information for at least one site based on real-time footfall data thereof. Furthermore, the present disclosure also relates to computer program products comprising non-transitory machine-readable data storage mediums having stored thereon program instructions that, when executed by processors, cause the processors to execute steps of aforementioned computer-implemented methods.

BACKGROUND

The retail sector is going through a fundamental transformation driven by shifts in consumer behaviour. In this regard, the retailers are adapting to effective communication with prospective customers to advertise about their physical retail stores in proximity of the customer footfall. In this regard, targeted advertising has become increasingly common in recent years and is adopted by the retailers to target specific groups of people who are more likely to be interested in the products or services being advertised. Such targeted advertising includes, but is not limited to, demographic targeting (based on factors such as age, gender, and income), geographic targeting (based on specific geographic regions), behavioural targeting (based on online behaviour), and contextual targeting (based on the content being currently viewed). However, targeted advertising may be based on sensitive personal information about an individual, and thus is regulated by a number of laws and regulations to protect consumers' privacy and ensure that their personal information is not used inappropriately.

Conventionally, some point of interest (POI) databases exist that contain information about various locations such as businesses, landmarks, public facilities, and other notable places. However, the POI databases do not provide real-time footfall data because they do not have access to real-time information about the number of people visiting a particular location. Moreover, the historic footfall data offered by the POI databases is private as not mined outside of private property or in mass volumes. Furthermore, the conventional footfall measuring solutions in the retail sector are used only for historic data reporting, a customer flow in store and store comparisons.

Therefore, in the light of the foregoing discussion, there exists a need to overcome the aforementioned drawbacks associated with activation of real-time information display.

SUMMARY

The aim of the present disclosure is to provide a system and a computer-implemented method to effectively incorporate real-time footfall data in activation of display of information. The aim of the present disclosure is achieved by a system and a computer-implemented method for automated as defined in the appended independent claims to which reference is made to. Advantageous features are set out in the appended dependent claims.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Figure 1:
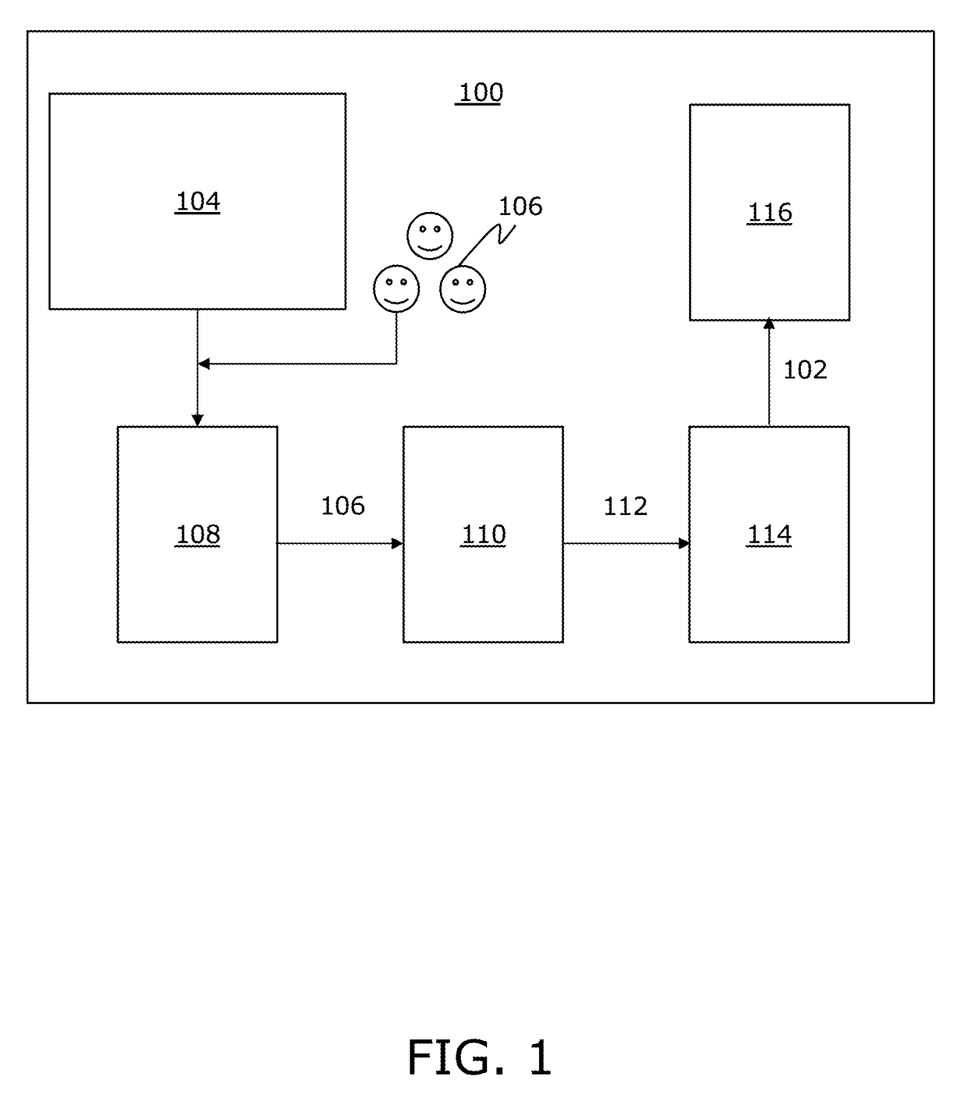
FIG. 1 illustrates a block diagram of a system for automating activation of display of information for at least one site based on a real-time footfall data, in accordance with an embodiment of the present disclosure.
Figure 2:
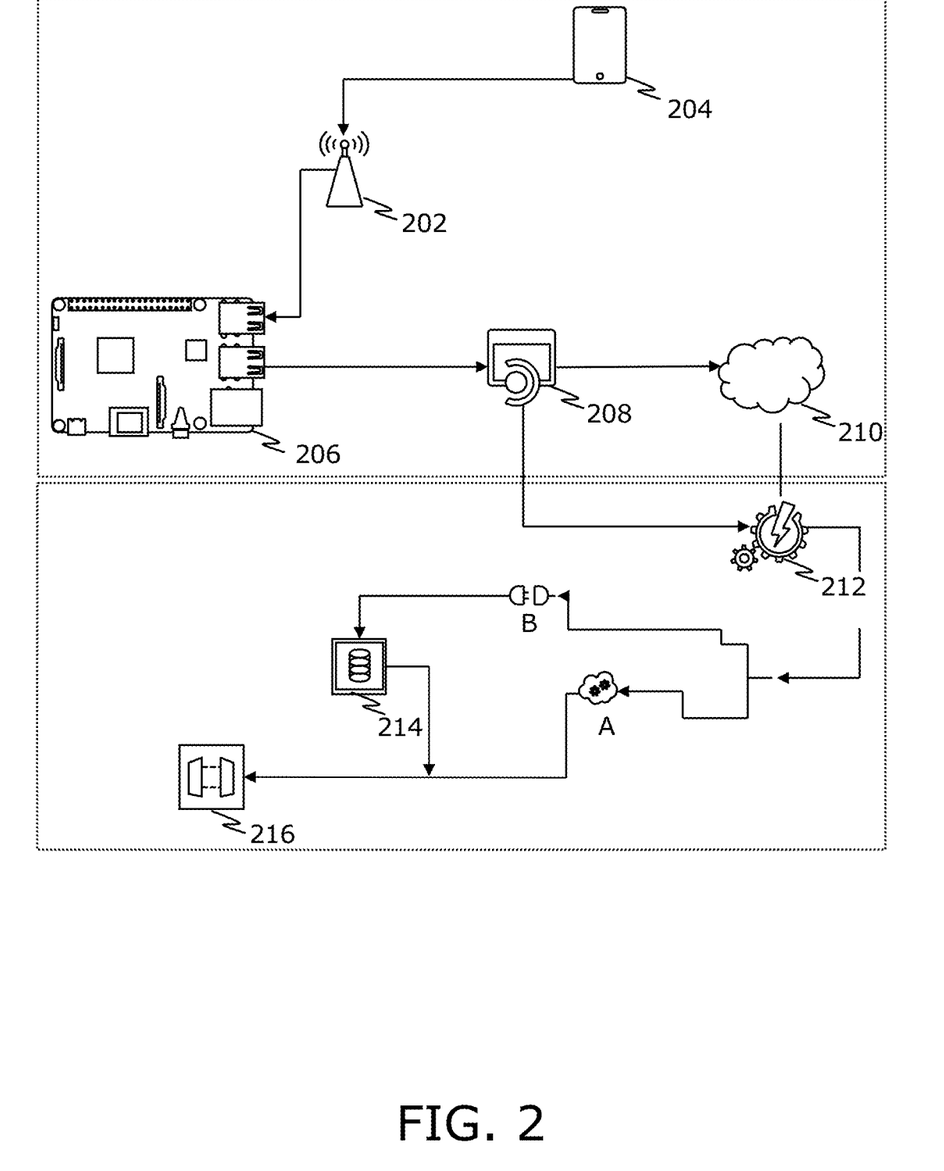
FIG. 2 illustrates an implementation of an Internet of Things (IoT) device for collecting a real-time footfall data of a given site, in accordance with an embodiment of the present disclosure.

In a first aspect, the present disclosure provides a system for automating activation of display of information for at least one site based on a real-time footfall data thereof, the system comprising:
  a sensor arrangement operatively coupled to a given site and configured to collect real-time footfall data of the given site at intervals of a predefined time-period, said sensor arrangement comprises:
    one or more sensors capable of detecting footfall data;
    an Internet of Things (IoT) device configured to detect Media Access Control (MAC) addresses present in the given site during the predefined time-period, wherein the real-time footfall data (106) comprises a count of the MAC addresses detected by the IoT device (202) in the pre-defined time-period, and a timestamp of a starting time of the predefined time-period; and
    a memory unit configured to store the collected real-time footfall data, count of MAC addresses detected by the IoT device in the predefined time-period, and the timestamp of the starting time of the predefined time-period;
  a server arrangement communicably coupled to the sensor arrangement, said server arrangement comprising one or more processing circuits configured to:
    receive the collected real-time footfall data of the given site from the corresponding sensor arrangement; and
    process the received real-time footfall data to generate a real-time metrics; and
  a web portal communicably coupled to the server arrangement and configured to:
    determine one or more potential display spots communicably coupled to the web portal that are located within a predetermined vicinity of the given site; and
    activate the display of information for the given site to be displayed on the determined one or more potential display spots, wherein at least one parameter associated with the display of information is selected based on the real-time metrics received from the server arrangement.

The system is uniquely designed to help solve one of the high street's biggest problems, i.e., unpredictable footfall and the need to react in real time to data without human intervention. In this regard, the system employs data (namely, footfall data from within retailer stores that serves as an actionable data set), automation and dynamic creativity to help retailers support their stores with real-time advertising. Advantageously, real-time display of information, such as real-time advertising, in proximity to store benefits both retailers and consumers by providing more contextual and relevant advertising which delivers better results for advertisers and more utility to the consumers. The system allows retailers to fully automate the activation of advertising based on real-time data inputs. In this regard, a retailer can pre-set rules in the system that if met can activate advertisements automatically via technology without the need for human input. This enables retailers to be agile and deliver marketing messages at the exact right time to consumers based on their business requirements. Moreover, automation of proximity advertising improves efficiency, effectiveness and return on investment for retailers. Additionally, the system allows multiple stores to be connected thus providing the opportunity to deliver location automated advertising across a range of stores that is tailored to real-time requirements.

In a second aspect, the present disclosure provides a computer-implemented method for automating activation of display of information for at least one site based on a real-time footfall data thereof, the computer-implemented method comprising:

- collecting, by a sensor arrangement operatively coupled to a given site, the real-time footfall data of a given site at intervals of a predefined time-period;
- detecting, by an Internet of Things (IoT) device comprised in the sensor arrangement, Media Access Control (MAC) addresses present in the given site during the predefined time-period, wherein the real-time footfall data comprises a count of the MAC addresses detected by the IoT device in the pre-defined time-period, and a timestamp of a starting time of the predefined time-period, wherein a memory comprised in the sensor arrangement is configured to store the collected real-time footfall data, count of MAC addresses detected by the IoT device in the predefined time-period, and the timestamp of the starting time of the predefined time-period
- receiving, by one or more processing circuits of a server arrangement, the collected real-time footfall data of the given site;
- processing, by the one or more processing circuits, the received real-time footfall data to generate a real-time metrics;
- determining, by a web portal communicably coupled to the server arrangement, one or more potential display spots that are located within a predetermined vicinity of the given site; and
- activating, by the web portal, the display of information for the given site to be displayed on the determined one or more potential display spots, wherein at least one parameter associated with the display of information is selected based on the real-time metrics.
- of information is selected based on the real-time metrics.

The method is uniquely designed to help solve one of the high street's biggest problems, i.e., unpredictable footfall and the need to react in real time to data without human intervention. In this regard, the method employs data (namely, footfall data from within retailer stores that serves as an actionable data set), automation and dynamic creativity to help retailers support their stores with real-time advertising. Advantageously, the real-time advertising in proximity to store benefits both retailers and consumers by providing more contextual and relevant advertising which delivers better results for advertisers and more utility to the consumers. The method allows retailers to fully automate the activation of advertising based on real-time data inputs. In this regard, a retailer can pre-set rules in the method that if met can activate advertisements automatically via technology without the need for human input. This enables retailers to be agile and deliver marketing messages at the exact right time to consumers based on their business requirements. Moreover, automation of proximity advertising improves efficiency, effectiveness and return on investment for retailers. Additionally, the method allows multiple stores to be connected thus providing the opportunity to deliver location automated advertising across a range of stores that is tailored to real-time requirements.

In a third aspect, the present disclosure provides a computer program product comprising a non-transitory machine-readable data storage medium having stored thereon program instructions that, when executed by a processor, cause the processor to execute steps of a computer-implemented method of aforementioned second aspect.

Throughout the present disclosure, the term "at least one site" refers to a physical location that serves as a data source, data from which is used to generate analytics that are most relevant to an area. In an embodiment, the at least one site is a commercial location which is used for business retail purposes. Optionally, the at least one site comprises at least one of: a shop, a retail store, a shopping mall, an event venue, and the like. In another embodiment, the at least one site is one or more retails counters within a single shop. It will be appreciated that the term "at least one site" refers to "one site" in some implementations, and "a plurality of sites" in other implementations. Optionally, the at least one site may be a single site in the case of a single retail store or a combination of multiple sites to generate analytics for an entire shopping mall or even multiple sites inside a multi-level or particularly large retailer store. In an alternative embodiment, the at least one site may refer to a public place, such as a hospital, a museum, a construction site, and so on.

Throughout the present disclosure, the term "real-time footfall data" refers to a measurement of a number of people entering and exiting from the at least one site in real-time. In case the at least one site is a retailer store, then the real-time footfall data measures the number of consumers or potential consumers entering or leaving that particular retailer store, after spending a given period of time therein. Notably, the real-time footfall data is analysed to gain insights into various trends and patterns based on demographics, interests and behaviours of the visitors of the at least one site. Subsequently, the insights and the analysis based on the real-time footfall data allows an owner of the at least one site to make strategic decisions (such as optimizing staffing, marketing strategies, and customer service) accordingly. It will be appreciated that there are a variety of conventional technologies used to collect real-time footfall data, including thermal imaging cameras, Wi-Fi tracking, and Bluetooth beacons, based on the specific needs of the business or organization.

Throughout the present disclosure, the term "display of information" refers to displaying a customized information that allows the user to reach a target audience (such as customer or potential customers of a retailer shop) in real-time more efficiently and effective. Optionally, the information is a real-time advertisement that allows a marketeer to reach its potential customers around the given site. Typically, the real-time advertisement may include images, videos, headlines, and ad copy to meet the business requirements. Optionally, the real time advertisement can be delivered through a variety of channels, including display advertisement, video advertisement, social media advertisement, and mobile advertisement.

The system comprises the sensor arrangement operatively coupled to the given site and configured to collect the real-time footfall data of the given site at the intervals of the predefined time-period. The term "sensor arrangement" as used herein refers to an arrangement of one or more sensors capable of sensing real-time footfall of the given site for the predefined time-period, used to determine the real-time footfall data of the given site for that predefined time-period. It will be appreciated that the sensor arrangement may be arranged at the entrance and exit points of the at least one site. Moreover, the real-time footfall data is repeatedly collected for pre-defined intervals of the predefined time-period. Beneficially, the real-time footfall data of a given site at intervals of a predefined time-period can be used to optimize site operations, improve customer service, and enhance security. Additionally, beneficially, collecting the real-time footfall data of the given site at intervals of a predefined time reduces computational costs associated with the sensor arrangement.

Optionally, the predefined time-period is of 30 seconds. It will be appreciated that collecting the real-time footfall data of the given site at intervals of a small, predefined time period prevents the data to require consent (if considered to be used for identifying and/or tracking) from the public at large. In this regard, the IoT device is advantageously trained to collect only that type of data which cannot be used for tracking or identification purposes in a short period of 30 seconds. Herein, the sensor arrangement records a data point every 30 seconds using the data it has collected in the period, in accordance with various jurisdictional regulations (such as General Data Protection Regulation (GDPR) in European Union (EU)). For example, the real-time footfall data of the given site, such as a retailer store, is collected throughout the day by dividing the day into 30 seconds period, to measure the number of people entering or exiting the retailer store. It will be appreciated that collecting the real-time footfall data in a 30 second period and then averaging over 5 minutes provides good results. Optionally, the predefined time-period of 30 seconds is based on factors such as electronic device model, version and operating system of the IoT device, network status, electronic device status, and the like.

Optionally, the sensor arrangement comprises an Internet of Things (IoT) device, wherein the IoT device is configured to detect Media Access Control (MAC) addresses present in the given site in the predefined time-period. Throughout the present disclosure, the term "IoT device" refers to any physical object (namely, a device) that is connected to the internet and can communicate with other devices or systems (such as cloud-based systems) for data exchange. It will be appreciated that the visitors of the given site may be carrying electronic devices (for example, mobile phones, laptops, smart watches, smart wearables, and the like) that are connected to the Internet, wherein each of the electronic device connected to the Internet has a unique MAC address associated therewith. Moreover, the electronic devices of the consumers have privacy protection mechanisms in places which allows to detect the MAC addresses for only the short period of time that allows data privacy of the consumers. Notably, the IoT device detects the MAC addresses (present in the given site in the predefined time-period) by detecting signals that are used to connect to the Internet (for example Wi-Fi connection, cellular network, and the like) from the corresponding electronic devices. It will be appreciated that the IoT device collects the MAC addresses of only those electronic devices that are within a physical range of the IoT device. In particular, the IoT device collects the MAC addresses of electronic devices that are within a first predefined area of the IoT device. Further, the IoT device may be coupled with one or more signal boosters to increase its detection property. For instance, by employing the one or more signal boosters, the IoT device can detect the MAC addresses of electronic devices that are within a second predefined area, where the first predefined has a smaller area in comparison to the second predefined area. Optionally, the IoT device includes smart floor sensors, thermal imaging cameras (use infrared technology to detect heat signatures), motion sensors (use infrared technology to detect motion), video analytics (equipped with software that uses computer vision), and so forth. Notably, the IoT devices can communicate data to a central hub or cloud-based system for analysis and reporting.

Optionally, the real-time footfall data comprises a count of the MAC addresses detected by the IoT device in the predefined time-period, and a timestamp of a starting time of the predefined time-period. It will be appreciated that the MAC addresses are anonymized by converting the MAC addresses from an original form to a hashed form (along with a collection timestamp), in order to secure a privacy of the users of the electronic devices whose MAC addresses are collected. Subsequently, to determine the count of the MAC addresses, a number of unique hashes of the MAC addresses that are generated within the predetermined time-period is counted. Optionally, the MAC addresses are converted to the hash form in a time of 10 milliseconds (msec). The MAC addresses are converted to the hash form using a cryptographic hash algorithm (for example, MD5), along with a randomly generated salt, wherein the salt is randomized for each interval of the predefined time-period. It will be appreciated that the IoT device at each site uses a different salt for anonymizing the MAC addresses. Notably, the count of the MAC addresses in the predefined time-period is related to a real-time footfall data (i.e., number of visitors) of the given site in that predefined time-period possessing one or more electronic devices associated with a MAC address. Notably, a higher value of the count of the MAC addresses indicates a higher value of the real-time footfall data. Likewise, a lower value of the count of the MAC addresses indicates a lower value of the real-time footfall data. Notably, after the count of the MAC addresses detected by the IoT device is determined, the collected MAC addresses along with their hashed form are removed from the IoT device. In addition to the count of the MAC addresses, it is important to associate the data point comprising the count of the MAC addresses recorded for every 30 second period to be associated with a timestamp. In this regard, the timestamp of the starting time of the predefined time-period (i.e., every 30 second period) is associated with the count of the MAC addresses to indicate an instance of time at which the IoT device starts to detect the MAC addresses present in the given site for the predefined time-period. For example, the real-time footfall data of the given site comprises 20 MAC addresses that are detected by the IoT device in the predefined time-period and the timestamp of 3:15:42 PM as the starting point of the predefined time-period.

Optionally, the sensor arrangement comprises a memory to store the collected real-time footfall data of the given store. In this regard, in case of failure of a network connection of the sensor arrangement with the server arrangement, the sensor arrangement is beneficially, able to temporarily or permanently store, locally in the memory unit associated therewith, the real-time footfall data of the given site for transmitting to the server arrangement when the network connection is re-established. The memory is configured to store the collected real-time footfall data, count of the MAC addresses detected by the IoT device in the pre-defined time-period, and the timestamp of the starting time of the predefined time-period. Generally, the memory stores data, files, and the like in any format. Optionally, the memory may be present within the sensor arrangement or may be connected to the sensor arrangement. The memory may include, but is not limited to, an electronic storage device, a magnetic storage device, an optical storage device, an electromagnetic storage device, a semiconductor storage device, or any suitable combination of the foregoing. Examples of implementation of the memory may include, but are not limited to, internal storage, external storage, a universal serial bus (USB), Electrically Erasable Programmable Read-Only Memory (EEPROM), Random Access Memory (RAM), Read Only Memory (ROM), a Hard Disk Drive (HDD), a Flash memory, a Secure Digital (SD) card, a Solid-State Drive (SSD), a computer-readable storage medium, CPU cache memory or any suitable combination of the foregoing.

Optionally, the sensor arrangement is further configured to compress the collected real-time footfall data. Notably, compressing the collected real-time footfall data reduces a size of data present in the collected real-time footfall data. Thus, beneficially, the compression of the collected real-time footfall data advantageously makes the collected real-footfall data more suitable to be transmitted to the server arrangement at a rapid rate without any loss of information. It will be appreciated that the compression of the collected real-time footfall data may be achieved by any conventional technique known to a person skilled in the art.

Moreover, the system comprises a server arrangement communicably coupled to the sensor arrangement. Throughout the present disclosure, the term "server arrangement" refers to a hardware, software, firmware or a combination of these, suitable for controlling the operation of the system. Examples of the server arrangement include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the server arrangement may refer to one or more individual server arrangements, serving devices and various elements associated with a serving device that may be shared by other serving devices. Additionally, one or more individual server arrangements, serving devices and elements are arranged in various architectures for responding to and processing the instructions that drive the system.

The server arrangement is configured to receive the collected real-time footfall data of the given site from the corresponding sensor arrangements. Notably, the collected real-time footfall data of the given site is sent from the corresponding sensor arrangement to the server arrangement using communication coupling therebetween. Herein, the corresponding sensor arrangement refers to a given sensor arrangement that is operatively coupled to the given site. For example, the server arrangement may receive the real-time footfall data of 5 sites from the 5 corresponding sensor arrangements. Optionally, the communication coupling, optionally including its associated communication network, includes a medium (e.g., a communication channel) through which the each of the sensor arrangement communicates with the server arrangement. The communication network may be a wired or wireless communication network. Examples of the communication coupling may include, but are not limited to, the Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS) and a Metropolitan Area Network (MAN).

Moreover, the server arrangement is configured to process the received real-time footfall data to generate the real-time metrics. Throughout the present disclosure, the term "real-time metrics" refers to data that is continuously generated from filtering and arranging the real-time footfall data received for each of the given site in a way that makes the real-time footfall data more useful in analyzing the behaviours, interests, and the patterns of the visitors of each of the given sites in real-time. Beneficially, the real-time metrics are essential for organizations to make data-driven decisions, identify opportunities, mitigate risks, and stay competitive in today's fast-paced business environment. They enable organizations to respond quickly to changing situations, adapt their strategies, and achieve better outcomes. In this regard, the real time metrics are most useful in giving an up-to-date view of the current footfall performance of a given site and the nearby advertisement spaces (namely the potential advertisement spaces) and from that the disclosed system enables a user thereof to activate the advertising. For example, a retail store manager is able to see, using the real-time metrics, that the mall or location that they are situated in is currently more busy than usual and would probably be a good time to advertise.

Optionally, the real-time metrics includes inference such as if there is a surge or a fall in the real-time footfall of the given site in comparison to average hourly footfall of the given site. For example, the generated real-time metrics shows a surge in the real-time footfall of a site A by 20 percent in comparison to the average hourly footfall of the site A. Alternatively, optionally, the real-time metrics includes inference such as if there is a surge or a fall in the real-time footfall of the given site in comparison to the real-time footfall of another given site from amongst the at least one site at a similar timestamp to the timestamp of the real-time footfall data of the given site. For example, the generated real-time metrics shows the fall in the real-time footfall data of the site A in comparison to the real-time footfall of a site B and a site C at the timestamp of 5:11:18 PM. Alternatively, optionally, the real-time metrics includes inference such as if there is a surge or a fall in the real-time footfall of the given site in comparison to a weekly historical footfall of the given site. For example, the generated real-time metrics shows a fall in the real-time footfall of a site A by 10 percent in comparison to the weekly historical footfall of the site A.

Optionally, the server arrangement is configured to employ a Machine Learning (ML) model to process the real-time footfall of the given site for generating the real-time metrics. The ML model is trained based on the historical real-time footfall data to update itself (i.e., the ML model) in a continuous manner. In other words, the ML model operates in a closed feedback loop where the historical real-time footfall data is used to efficiently generate or determine the real-time metrics. Notably, the ML model comprises a strategy profiler, a panel profiler, and a strategy panel, that work together for automating the process of generating the real-time metrics (with a goal of maximizing uplifting and minimizing cost). The strategy profiler trains the ML model to learn what characteristics and conditions are desirable for the given site. The panel profiler trains the ML model to learn what characteristics and conditions lead to a maximum effect on the uplift. The strategy panel uses a vector similarity search on a PostgreSQL database to find panels best suited for the given site. Subsequently, when a set of potential panels are found, the real-time conditions are fed through each panel profile to estimate the effect of the display of information on the uplift. The estimated effects are compared against a cost of the panel and a predetermined budget to determine the real-time metrics. In an example, characteristics that are used to train the strategy profile may include but are not limited to an industry, a minimum age in the real-time footfall data, a maximum age in the real-time footfall data, a brand associated with the given site, an interest, an impulse, a CTA, and the like. In another example, characteristics that are received as output of the strategy profile, and used to train the panel profile are a time of the day, a day of the week, a temperature, a pollen count, geographic properties (such as, proximity to the given site, location of entrance of the given site, and the like), and the like.

Optionally, the server arrangement is further configured to apply a set of filters on the received real-time footfall data; compare the filtered real-time footfall data with a historical footfall data, that is stored in the server arrangement, to determine a deviation in footfall numbers of the given site; and
generate the real-time metrics based on the determined deviation in the footfall numbers of the given site.

In this regard, optionally, the set of filters that may be applied to real-time footfall data include, but are not limited to, a time-based filter, a location-based filter, a demographic-based filter, a traffic flow filter, and a repeat visitor filter. Typically, the time-based filter is configured to capture footfall data within a specific time range, such as during business hours or during specific events or promotions only, for filtering. The location-based filter is configured to capture footfall data from specific locations, such as a particular store or area within a larger space, such as a mall or a stadium. The demographic-based filter is configured to segment footfall data based on demographic information, such as age, gender, or ethnicity, to enable tailoring of the marketing or operational strategies accordingly. The traffic flow filter is configured to analyze the flow of footfall data, such as entry points, exit points, and movement patterns within a location, in order to, for example, optimize store layouts, plan staffing levels, and improve customer experience. The repeat visitor filter is configured to identify and analyze footfall data from repeat visitors, helpful in assessing customer loyalty, measuring repeat visitation rates, and identifying patterns or trends among repeat visitors. It will be appreciated that the type of filter may be selected based on specific business needs and goals, and may be customized and combined in any suitable combinations thereof to gain insights and make data-driven decisions.

Herein, the filtered real-time footfall data refers to the footfall numbers collected in real-time from a given site using the sensor arrangement, and the historical footfall data refers to footfall numbers that have been previously recorded and stored in the server arrangement. Moreover, comparing the filtered footfall real-time data with the historical footfall data to determine the deviations in the footfall numbers of the given site requires careful consideration of various factors, including, but not limited to, data source, timeframe, data granularity, data analysis techniques, external factors, and visualization methods. It will be appreciated that the comparison is done accurately and consistently to identify any deviations in the footfall numbers at a given site. For example, if the real-time footfall data is collected on an hourly basis, comparing it with a historical footfall data collected on a daily basis may not yield accurate results.

While generating the real-time metrics based on the determined deviation in the footfall numbers of the given site, the server arrangement comprises pre-defining a baseline and a deviation threshold. Subsequently, the server arrangement may be configured to monitor the real-time footfall data and calculate the deviation from the baseline using the determined threshold. For example, if the baseline footfall count is 1000, and the deviation threshold is set at 10%, any footfall count that deviates by more than 10% from the baseline would be considered significant. Based on the calculated deviation, real-time metrics that provide insights into the footfall patterns of the given site is generate. Optionally, the real-time metrics may provide insight into a percentage or absolute deviation from the baseline footfall number; an increase, decrease, or stable-over-time footfall number; alerts triggered when the footfall number exceeds the deviation threshold; distribution of footfall number across different time periods (e.g., hourly, daily, weekly) to identify peak or low footfall periods; visual representation of the generated metrics in an easily understandable format for stakeholders (such as charts, graphs, or dashboards); and appropriate actions to respond to the deviation in footfall numbers. Optionally, the generated real-time metrics may be used for adjusting staffing levels, modifying marketing or promotional strategies, or optimizing operations to align with the observed footfall patterns in a retail store. It will be appreciated that the appropriate action would depend on the specific context of the site and its business objectives.

Furthermore, the system comprises a web portal communicably coupled to the server arrangement and configured to:
determine one or more potential display spots communicably coupled to the web portal that are located within a predetermined vicinity of the given site; and
activate the display of information for the given site to be displayed on the determined one or more potential display spots, wherein at least one parameter associated with the display of information is selected based on the real-time metrics received from the server arrangement.

Herein, the term "web portal" refers to an online (web-based) platform or a website that is used for providing certain information and services over the Internet. Typically, the web portal offers a collection of links or widgets organized in a user-friendly manner, providing users with a convenient way to access multiple online services or content from one central location. Optionally, the web portals may be used for various purposes, such as information dissemination, communication, collaboration, e-commerce, entertainment, and more. More optionally, the web portals may be used for activation of the display of information of the at least one site at one or more potential display spots. In this regard, the web portals may include features such as user registration, login, customization options, search functionality, communication tools, and integration with other online services, to activate the display of information of the at least one site. Typically, the web portal provides a user interface that allows users to interact with the web portal and access various resources and services therefrom, and the server arrangement supports the web portal by handling data processing, storage, and communication at back-end.

The term "potential display spot", as used herein refers to a public location with an available screen that can be potentially used for the display of information for the given site. Optionally, the one or more potential display spots are used for the display of information to attract potential consumers for the given site. It will be appreciated that the one or more potential display spots are determined only within the predetermined vicinity of the given site (i.e., within a particular area around the given site), in order to target those potential consumers that are nearby the given site to visit the given site. Notably, the one or more potential display spots are communicably coupled to the server arrangement in order to enable the server arrangement to know about an availability of the one or more potential display spots to display the information of the given site and to share data of the information with the one or more potential display spots. Optionally, the one or more potential display spots are selected from: shopping malls, airports, commercial centres, public hoardings, high streets, and the like. Optionally, the predetermined vicinity of the given site may be a radius of 0.01 meters to 100.0 meters from the given site. The predetermined vicinity of the given site may be, for example, 0.01, 0.05, 0.1, 0.2, 0.3, 0.4, 0.5, 1.0, 10.0, 30.0, 60.0 or 90.0 up to 0.05, 0.1, 0.2, 0.3, 0.4, 0.5, 1.0, 10.0, 30.0, 60.0, 90.0 or 100.0 meters from the given site.

Herein, once the one or more potential display spots are determined and an advertising account is set up therefor, the web portal activates the display of information. It will be appreciated that the display of information is activated based on a target audience (defined by demographics, interests, and behaviours thereof), a budget, and other campaign settings.

Throughout the present disclosure, the term "at least one parameter" refers to one or more features or attributes selected to be customized based on the real-time metrics. Optionally, the at least one parameter is selected from: the content of the real-time advertisement, the frequency of displaying the information, the duration of displaying the real-time advertisement, and the like. Moreover, the real-time metrics of the given site may be used to customize the selected at least one parameter associated with the real-time advertisement. For example, the real time advertisement is activated to show special discounts or different graphics that shows dynamically changing elements (content) of the real time advertisement for a period of 5 minute based on the real-time metrics of a particular shop or counter in a mall.

In an implementation scenario, if the real-metrics shows the real-time footfall data of the given site to be less than the average hourly footfall data of the given site, then the content of the information is customized to offer a higher value of discount at the given site. In another implementation scenario, if the real-metrics shows the real-time footfall data of the given site to be less than the real-time footfall data of the another given site, then the frequency of displaying the information is customized to be shown at a higher frequency. Notably, to activate the display of information, the web portal shares information related to the at least one parameter associated with the display of information that is selected, and subsequently, the display of information is activated to be displayed on the determined one or more potential display spot.

Optionally, the system is further configured to send alerts if there are any significant changes in the footfall patterns of the given site, thereby, enabling the user to take immediate action if there is a sudden increase or decrease in the footfall of the given site.

The present disclosure also relates to the computer-implemented method as described above. Various embodiments and variants disclosed above, with respect to the aforementioned system, apply mutatis mutandis to the computer-implemented method.

Optionally, the step of collecting the real-time footfall data of the given site at the intervals of the predefined time-period comprises detecting media access control (MAC) addresses present in the given site in the predefined time-period.

Optionally, the real-time footfall data comprises a count of the mac addresses detected in the pre-defined time-period, and a timestamp of a starting time of the predefined time-period.

Optionally, the predefined time-period is of 30 seconds.

Optionally, the computer-implemented method further comprises compressing the collected real-time footfall data.

Optionally, the computer-implemented method further comprises:
applying a set of filters on the received real-time footfall data;
comparing the filtered real-time footfall data with a historical footfall data, that is stored in a server arrangement, to determine a deviation in footfall numbers of the given site; and
generating the real-time metrics based on the determined deviation in the footfall numbers of the given site.

The present disclosure also relates to the computer program product as described above. Various embodiments and variants disclosed above, with respect to the aforementioned system and the aforementioned computer-implemented method, apply mutatis mutandis to the computer program product.

Experimental Part

A retailer wants to keep their stores optimised for footfall, but fails to determine when or which store will need advertising support, as footfall patterns are unpredictable. The disclosed system automatically detects irregular patterns and triggers a footfall boost with advertising to shoppers nearby. When footfall stabilises, the system will turn off advertising to save money.

A brand wants to run an advertising campaign that only shows adverts in locations where they have nearby stores. They want the advertisements to only run when the real-time footfall (pollen count) in the area is higher than normal and when the real-time footfall count is at a certain level (i.e., predefined threshold) to optimise their investment.

A retailer wants to run multiple regional or localised campaigns across multiple locations that all have an installed footfall sensor arrangement, they want to compare the results of each campaign and see what happened to the stores' footfall on an hour-hour basis when the advertisements were playing and when they weren't.

A retailer wants to promote low queue time as a good reason to visit their store in their advertising content.

DETAILED DESCRIPTION OF THE DRAWINGS

Referring to FIG. 1, illustrated is a block diagram of a system 100 for automating activation of display of information 102 for at least one site (depicted as a given site 104) based on a real-time footfall data 106 thereof, in accordance with an embodiment of the present disclosure. As shown, the system comprises a sensor arrangement 108 operatively coupled to the given site 104 and configured to collect the real-time footfall data 106 of the given site 104 for intervals of a predefined time-period. Moreover, the system comprises a server arrangement 110 communicably coupled to the sensor arrangement 108. The server arrangement 110 is configured to receive the collected real-time footfall data 106 of the given site 104 from the sensor arrangement 108. Moreover, the server arrangement 110 is configured to process the received real-time footfall data 106 for the given site 104 to generate real-time metrics 112. Furthermore, the system 100 comprises a web portal 114 communicably coupled to the server arrangement 110. The web portal 114 is configured to determine one or more potential display spots (depicted as a display spot 116) communicably coupled to the web portal 114 that are located within a predetermined vicinity of the given site 104. Moreover, the web portal 114 is configured to activate the display of information 102 for the given site 104 to be displayed on the determined potential display spot 116, wherein at least one parameter associated with the display of information 102 is selected based on the real-time metrics received from the server arrangement 114.

Referring to FIG. 2, illustrated is an implementation of an Internet of Things (IoT) device for collecting real-time footfall data of a given site, in accordance with an embodiment of the present disclosure. As shown, an ARM platform IoT device 202 associated with the sensor arrangement. The IoT device 202 is configured with a 4G network connection that hosts a WiFi network in order to capture WiFi broadcasts from mobile devices 204 that are searching for WiFi network via broadcast pings are provided. The IoT device 202 acts as an access point using Hostapd and functions based on MAC address signal strength packet length. A server arrangement 206 is coupled with the IoT device 202 via a USB WiFi adaptor. The server arrangement 206 run a software program 208 for 30 seconds to record unique MAC addresses from the mobile devices 204. The recorded unique MAC addresses are stored in a memory 210 associated with the server arrangement 206. A dynamic timer 212 is arranged with the server arrangement 206 to timestamp a starting time of the predefined time-period of recording the unique MAC addresses. As shown, the dynamic timer 212 can function in both online mode A and an offline mode B. In the online mode A, the data of the dynamic timer 212 is collected, compressed and stored in a memory unit 216 for processing. In the offline mode B, the data of the dynamic timer 212 is stored locally in a local memory 214 for a pre-defined period of time, i.e., until the online mode A is achieved back. The data from the local memory 214 is collected, compressed and stored in the memory unit 216 for processing.

Figure 3:
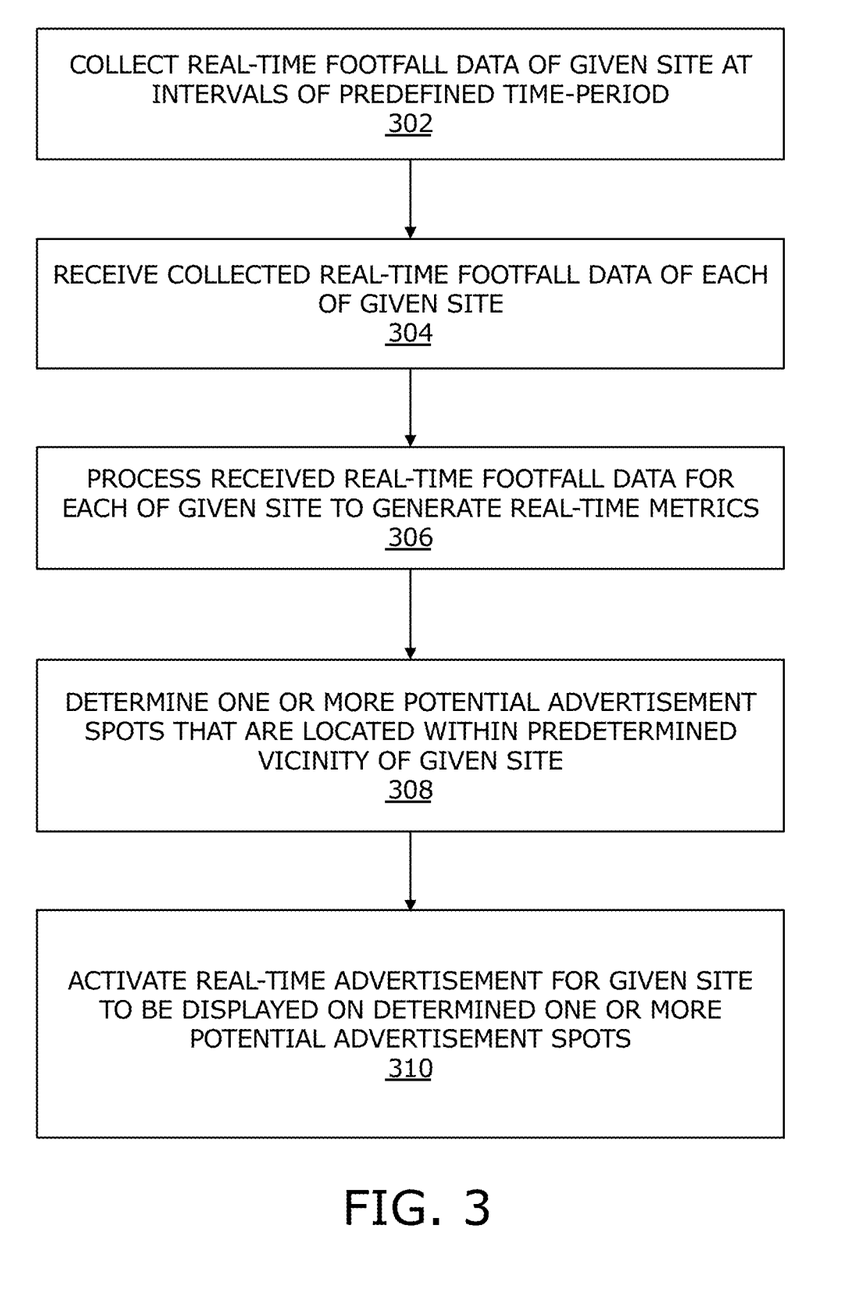
FIG. 3 illustrates a flowchart depicting steps of a method for automating activation of display of information for at least one site based on a real-time footfall data, in accordance with an embodiment of the present disclosure.

Referring to FIG. 3, illustrated is a flowchart depicting steps of a method for automating activation of display of information for at least one site based on a real-time footfall data, in accordance with an embodiment of the present disclosure. At a step 302, the real-time footfall data of a given site is collected at intervals of a predefined time-period. At a step 304, the collected real-time footfall data of the given site is received. At a step 306, the received real-time footfall data is processed to generate a real-time metrics. At a step 308, one or more potential display spots that are located within a predetermined vicinity of the given site are determined. At a step 310, the display of information for the given site is activated to be displayed on the determined one or more potential display spots, wherein at least one parameter associated with the display of information is selected based on the real-time metrics.

Figure 4:
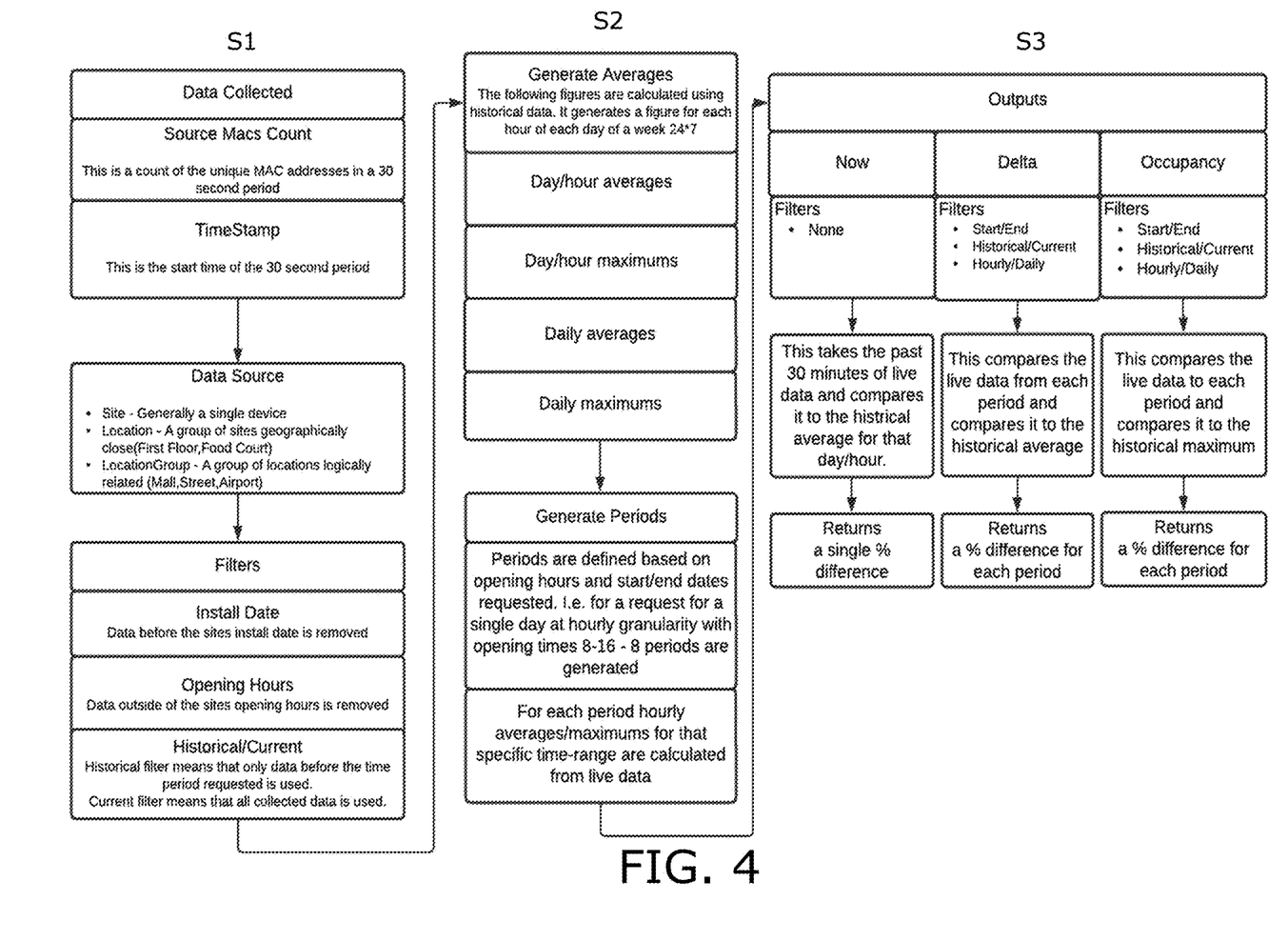
FIG. 4 illustrates a flowchart depicting steps of collecting and processing a real-time footfall data of a site, in accordance with an embodiment of the present disclosure.

Referring to FIG. 4, illustrated is a flowchart depicting steps of collecting and processing a real-time footfall data of a site, in accordance with an embodiment of the present disclosure. M.A.C addresses are broadcasted by phones, laptops and other WiFi enabled devices. The sensor arrangement (such as the sensor arrangement 108 of FIG. 1) collects and counts unique MAC addresses seen in thirty second periods. This data is aggregated and sent to a server arrangement (such as the server arrangement 110 of FIG. 1). The data is processed and analysed to generate real-time metrics which are used to trigger the display of information. Notably, the display of information is set up in a web portal 114 platform and assigned trigger parameters which are used by a timed service, namely, the dynamic timer 212 of FIG. 2, that uses the real-time footfall data to enable and disable the advertisements.

As shown, at a step S1, the real-time footfall data is collected. In this regard, unique MAC addresses of various electronic devices associated with visitors (or footfall) of the site is collected and associated with a time-stamp. Notably, the real-time footfall data is collected using one or more sensor arrangements arranged at a single site, in a group of geographically close location (eg., first floor, food court), or a group of locations logically related (eg., mall, street, airport). The collected real-time footfall data may be filtered based on at least one of: a date of installation of the sites (data before the sites are installed is removed), opening hours (data outside of the opening and closing hours of the sites are removed), historical data (data before the requested time-period only is used), and/or current data (all the data collected is used). At a step S2, the filtered data is used to generate averages, such as day/hour average, day/hour maximums, daily averages and daily maximums. Moreover, the filtered data is used to generate periods. The periods are defined based on opening hours and start/end dates requested. For example, for a request for a single day at hourly granularity with opening times 800-1600 hours, 8 (1600-800 hours/1 hour) periods are generated. Additionally, for each period, hourly averages/maximums for that specific time-range may be calculated from the real-time footfall data (namely, live data). At a step S3, outputs are generated for various categories, namely, 'Now', 'Delta' and 'Occupancy', wherein 'Now' category has no filters and takes the past 30 minutes of live data, compares it to the historical average for that day/hour, and returns a single percent (%) difference. The 'Delta' category uses filters (such as Start/End, Historical/Current and Hourly/Daily), compares the live data from each period and compares it to the historical average, and returns a % difference for each period. The 'Occupancy' category uses filters (such as Start/End, Historical/Current and Hourly/Daily), compares the live data to each period and compares it to the historical maximum, and returns a % difference for each period.

The invention claimed is:

1. A system for automating activation of display of information for at least one site based on a real-time footfall data thereof, the system comprising:
   a sensor arrangement operatively coupled to a given site and configured to collect real-time footfall data of the given site at intervals of a predefined time-period, said sensor arrangement comprises:
      one or more sensors capable of detecting footfall data;
      an Internet of Things (IoT) device configured to detect Media Access Control (MAC) addresses present in the given site during the predefined time-period, wherein the real-time footfall data comprises a count of the MAC addresses detected by the IOT device in the pre-defined time-period, and a timestamp of a starting time of the predefined time-period; and a memory unit configured to store the collected real-time football data, count of MAC addresses detected by the IoT device in the predefined time-period, and the timestamp of the starting time of the predefined time-period;

a server arrangement communicably coupled to the sensor arrangement, said server arrangement comprising one or more processing circuits configured to:

receive the collected real-time footfall data of the given site from the corresponding sensor arrangement; and process the received real-time footfall data to generate a real-time metrics; and a web portal communicably coupled to the server arrangement and configured to:

determine one or more potential display spots communicably coupled to the web portal that are located within a predetermined vicinity of the given site; and activate the display of information for the given site to be displayed on the determined one or more potential display spots, wherein at least one parameter associated with the display of information is selected based on the real-time metrics received from the server arrangement.

2. The system according to claim 1, wherein the predefined time-period is of 30 seconds.

3. The system according to claim 1, wherein the sensor arrangement is further configured to compress the collected real-time footfall data.

4. The system according to claim 1, wherein the server arrangement is further configured to:

apply a set of filters on the received real-time footfall data;

compare the filtered real-time footfall data with a historical footfall data, that is stored in the server arrangement, to determine a deviation in footfall numbers of the given site; and generate the real-time metrics based on the determined deviation in the footfall numbers of the given site.

5. A computer-implemented method for automating activation of display of information for at least one site based on real-time footfall data thereof, the computer-implemented method comprising:

collecting, by a sensor arrangement operatively coupled to a given site, the real-time footfall data of a given site at intervals of a predefined time-period;

detecting, by an Internet of Things (IoT) device comprised in the sensor arrangement, Media Access Control (MAC) addresses present in the given site during the predefined time-period, wherein the real-time footfall data comprises a count of the MAC addresses detected by the IOT device in the pre-defined time-period, and a timestamp of a starting time of the predefined time-period, wherein a memory comprised in the sensor arrangement is configured to store the collected real-time footfall data, count of MAC addresses detected by the IoT device in the predefined time-period, and the timestamp of the starting time of the predefined time-period receiving, by one or more processing circuits of a server arrangement, the collected real-time footfall data of the given site;

processing, by the one or more processing circuits, the received real-time footfall data to generate a real-time metrics;

determining, by a web portal communicably coupled to the server arrangement, one or more potential display spots that are located within a predetermined vicinity of the given site; and activating, by the web portal, the display of information for the given site to be displayed on the determined one or more potential display spots, wherein at least one parameter associated with the display of information is selected based on the real-time metrics.

6. The computer-implemented method according to claim 5, wherein the predefined time-period is of 30 seconds.

7. The computer-implemented method according to claim 5, further comprising compressing the collected real-time footfall data.

8. The computer-implemented method according to claim 5, further comprising:

applying a set of filters on the received real-time footfall data;

comparing the filtered real-time footfall data with a historical footfall data, that is stored in a server arrangement, to determine a deviation in footfall numbers of the given site; and generating the real-time metrics based on the determined deviation in the footfall numbers of the given site.

9. A computer program product comprising a non-transitory machine-readable data storage medium having stored thereon program instructions that, when executed by a processor, cause the processor to execute steps of a computer-implemented method of claim 5.

* * * * *